United States Patent [19]
Thomas et al.
[11] Patent Number: 4,842,435
[45] Date of Patent: Jun. 27, 1989

[54] ADJUSTABLE DOCUMENT HANDLE

[75] Inventors: Kent Thomas, Mayville; Daniel R. Bullis, Jr., Madison; Thomas J. Bottelson, Baraboo, all of Wis.
[73] Assignee: Tab Products Company, Palo Alto, Calif.

[21] Appl. No.: 153,346
[22] Filed: Feb. 8, 1988
[51] Int. Cl.[4] ......... B42F 13/00; B42F 7/16; B42F 15/00; B60R 7/00
[52] U.S. Cl. ......... 402/80 R; 211/45; 224/277; 312/184
[58] Field of Search ......... 402/4, 38, 73, 74, 80 R; 160/62, 71, 80, 372; 283/40, 89, 94; 211/45, 46, 47, 162; 292/41, 152, 87; 224/45 A, 45 R, 46 R, 57, 46.5, 277; 312/183, 184, 188

[56] References Cited

U.S. PATENT DOCUMENTS

| | | | |
|---|---|---|---|
| 1,315,656 | 9/1919 | Burgener | 211/45 |
| 3,120,971 | 2/1964 | Bengtsson | 292/91 |
| 3,729,099 | 4/1973 | Kritske | 211/46 |
| 3,790,242 | 2/1974 | Sullivan | 312/184 |
| 3,865,445 | 2/1975 | Dean et al. | 312/184 |
| 3,950,048 | 4/1976 | Unti et al. | 312/184 |
| 3,977,527 | 8/1976 | Rose et al. | 312/184 |
| 4,306,736 | 12/1981 | Cournover et al. | 402/80 P |
| 4,445,799 | 5/1984 | Wright et al. | 312/183 |
| 4,652,165 | 3/1987 | Bertesi et al. | 312/184 |
| 4,666,047 | 5/1987 | Fletcher | 312/184 |

*Primary Examiner*—Frank T. Yost
*Assistant Examiner*—Paul M. Heyrana, Sr.
*Attorney, Agent, or Firm*—Donald Cayen

[57] ABSTRACT

A document handle comprises a pair of elongated members. The outer ends of the document handle are provided with webs having hooked openings for engaging the binder posts of a bound multi-page document. The first member is formed as a channel adapted to slidingly receive the second member. The second member is formed with latches that engage openings in the first member to lock the two members together in positions at which the webbed openings engage the binder posts. Several sets of openings can be formed in the first member, so that the same document handle can be used with a variety of standard size papers.

35 Claims, 4 Drawing Sheets

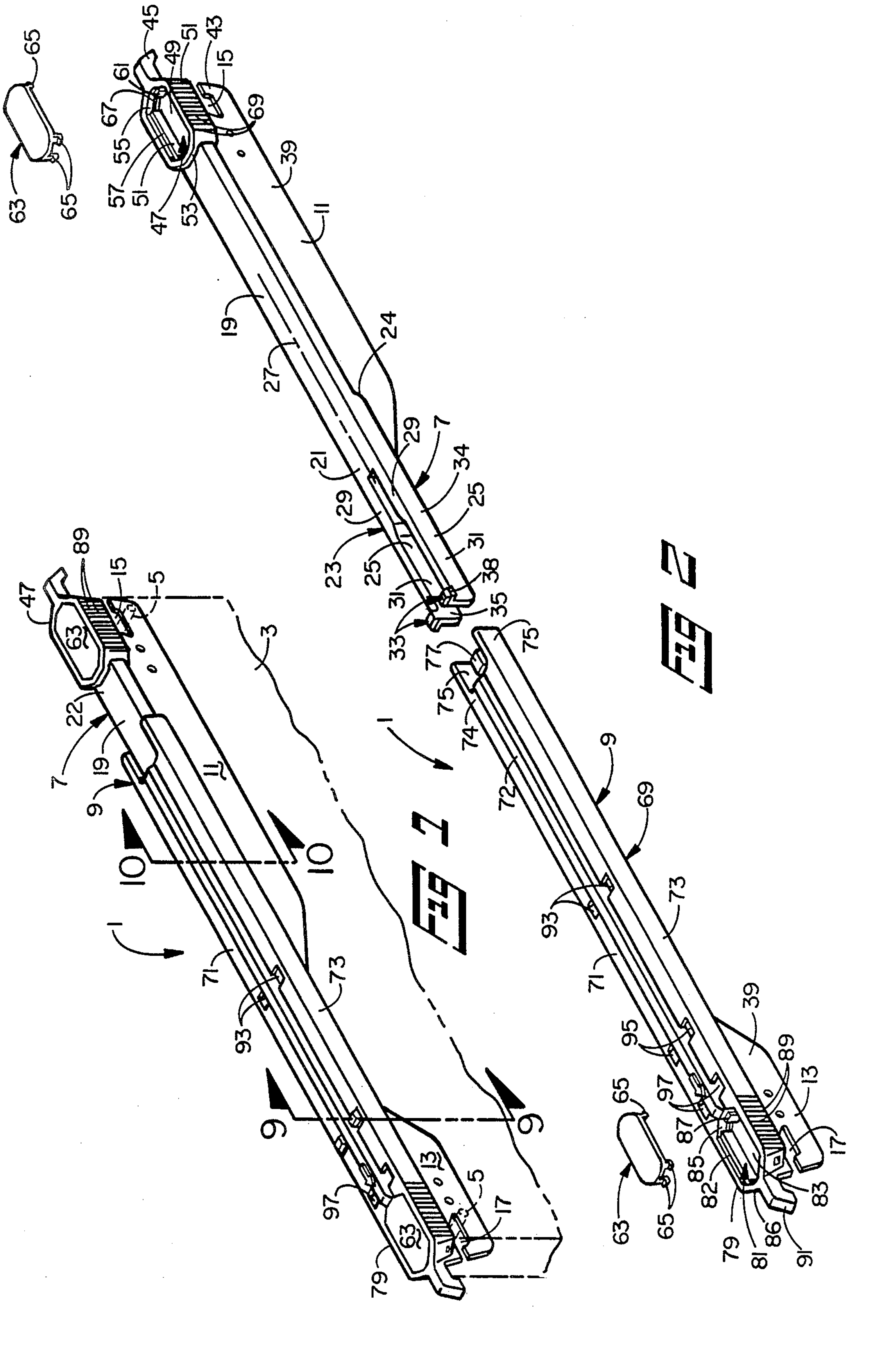

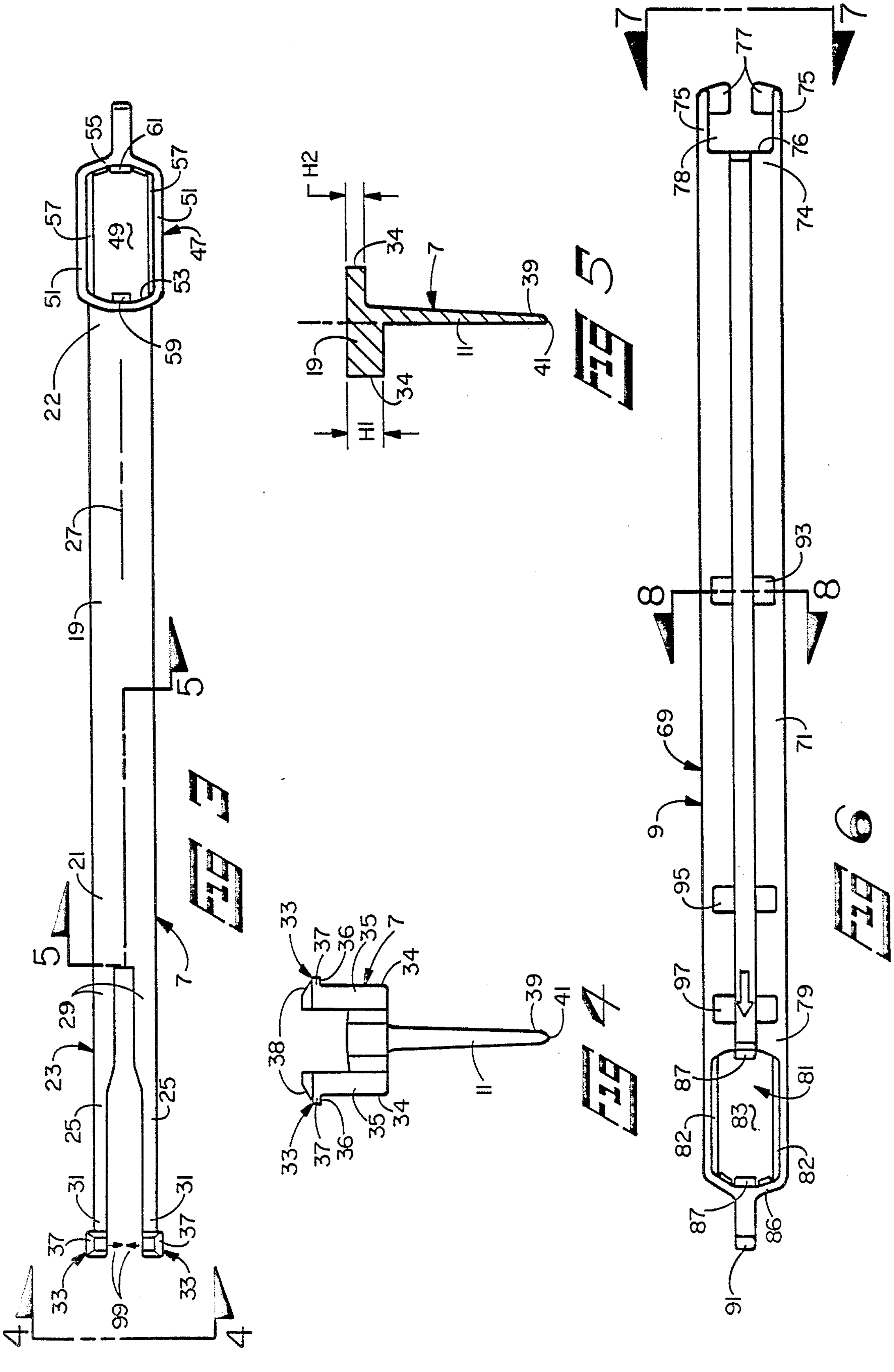

ADJUSTABLE DOCUMENT HANDLE

BACKGROUND OF THE INVENTION

1. Field of the Invention. This invention pertains to media storage and retrieval, and more particularly to apparatus for managing multi-page documents.

2. 2. Description of the Prior Art. Various products have been developed to gather and store thick paper documents such as computer print outs, reports, and manuals. Such products are becoming increasingly important as the volume of paperwork swells in modern offices.

A known paper handling product is the cartridge type binder, wherein the papers are suspended by pins passing through mounting holes in the paper. The pins are supported by two structural members that are selectively pivotable between open and closed configurations. In the open configuration, one end of the pins are free to receive or release the paper mounting holes. In the closed configuration, the structural members form a channel for receiving the papers and for supporting both ends of the pins. The cartridge type binder is usually equipped with means for hanging the cartridge and papers in a storage cabinet or rack. Thus, the cartridge type binder is capable of both binding and storing a sheaf of papers. An exemplary cartridge type document holder is disclosed in our co-pending U.S. patent application Ser. No. 153,344 filed on Feb. 8, 1988.

Another type of product used for storing documents is shown in U.S. Pat. Nos. 3,790,242 and 3,950,048. The carrier handles of the two aforementioned patents comprise relatively thin webs that are inserted into a stack of papers that are bound by conventional binder posts. The handles have hooks for supporting the binder posts for carrying the papers and handle together.

Although generally satisfactory for their intended purposes, the prior carrier handles suffer certain disadvantages. For example, the device of the U.S. Pat. No. 3,950,048 patent requires that the handled be bowed to permit the end hooks to engage the binder posts. The force required to bow the handle is difficult to control, and excessive bowing force can break a handle. Further, the handle of the U.S. Pat. No. 3,950,048, like that of the U.S. Pat. No. 3,790,242 patent, is usable with only a single size paper with the corresponding standard spacing between the mounting holes.

Thus, a need exists for an improved carrier handle for bound documents.

SUMMARY OF THE INVENTION

In accordance with the present invention, an adjustable document handle is provided that enhances the management of multi-page documents in an economical and convenient manner. This is accomplished by apparatus that includes a pair of interlocking members that are relatively slideable to engage the binder posts of several standard sizes of bound papers.

The first handle member is an inner slide comprised of an elongated rigid plate, a thin web depending from the plate, and a flexible fork extending longitudinally from one end of the plate. The second handle member is an adjustable end formed as an elongated rigid channel having a thin web depending from the channel top leg and between the channel side legs. The second member channel is sized to slideably receive the first member plate and fork. The channel top leg defines a series of openings adapted to receive latches on the first member fork in a manner that releaseably locks the two members together. The first member plate and fork are retained in the second member channel by the combination of a pair of lips joined to the channel side legs underlying the first member plate and the fork latches in engagement with the channel openings. The web of each member defines a hooked opening sized to engage a document binder post.

A person uses the document handle of the present invention by sliding the plate and flexible fork of the first member within the second member channel until the spread between the two web openings is slightly less than the spread between the binder posts of the documents with which the handle is to be used. She then inserts the web between the pages of the bound documents. She next spreads the two members apart slightly until the web openings engage the respective document binder posts. At that location, the latches of the flexible fork of the first member enter the associated openings of the second member channel, thereby locking the two members into a convenient carrying handle.

Further in accordance with the present invention, the adjustable handle second member channel may be manufactured with different means for storing the handle and bound papers. In one embodiment, the second member is form as a T-shaped support for engaging appropriate elongated channels in a storage cabinet or rack. In another embodiment, the second member is manufactured with a hook joined to the channel for suspending the handle and papers from a rod that is transverse to the channel.

Other advantages, benefits, and features of the invention will become apparent to those skilled in the art upon reading the detailed disclosure of the invention.

BRIEF DESCRIPTION OF THE DRAWINGS

FIG. 1 is a perspective view of the document handle of the present invention in the assembled condition.

FIG. 2 is an exploded perspective view of the components of the document handle of the present invention.

FIG. 3 is a top view of the first member of the document handle of the present invention.

FIG. 4 is an enlarged view taken along lines 4—4 of FIG. 3 and rotated 90 degrees counterclockwise.

FIG. 5 is an enlarged cross sectional view taken along lines 5—5 of FIG. 3 and rotated 90 degrees counterclockwise.

FIG. 6 is a top view of the second member of the handle of the present invention.

DETAILED DESCRIPTION OF THE INVENTION

Figure 8:
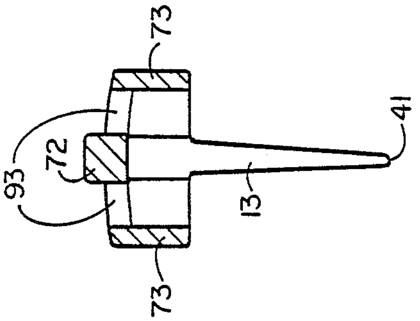
FIG. 8 is an enlarged cross sectional view taken along lines 8—8 of FIG. 6 and rotated 90 degrees counterclockwise.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, an adjustable document handle 1 is illustrated that includes the present invention. The document handle is particularly useful for carrying and storing a sheaf of papers 3 that are bound together with conventional binder posts 5.

Referring also to FIG. 2, the document handle 1 is comprised of four components: a first member 7 referred to as an inner slide, a second member 9 known as an adjustable end, and a pair of plugs 63. The inner slide 7 slidingly fits within the adjustable end 9. The inner slide is lockable to the adjustable end at several discrete locations therealong; in FIGS. 1 and 2, three such locations are possible. However, additional locations are easily provided, if necessary, to suit different media sizes.

The opposed outer ends of the inner slide 7 and adjustable end 9 are formed with respective webs 11 and 13. The outside ends of the webs 11 and 13 define respective hooked openings 15 and 17 that are adapted to engage the document binder posts 5, as will be fully explained hereinafter.

Looking at FIGS. 1-5, the inner slide 7 comprises a plate 19 having a generally rectangular cross section. In the illustrated construction, the plate 19 is manufactured with two different thicknesses. Near the plate inside end 21, the plate has a first thickness H1. Near the plate outside end 22, the plate has a lesser thickness H2, thereby creating a step 24 in the plate.

To the plate inside end 21 is joined a flexible fork 23. The flexible fork 23 preferably is formed as a pair of cantilevered fingers 25 that are symmetrical about the inner slide longitudinal axis 27. The fingers 25 have a uniform height H1 equal to that of the plate inside end 21. Each finger 25 has a relatively thick base section 29 adjacent the plate end 21 and a thinner free end 31. The various dimensions of the fingers are such that they are rigid against bending in the plane perpendicular to the plane of the plate 19, but they are flexible in the plane of the plate. That is, the fingers are flexible in the directions of the arrows 99. At the end of each finger free end 31 is a latch 33. Each latch 33 is formed as a short upstanding leg 35 joined to the finger free end. At the top of each leg 35 is a tab 37, which has an undercut surface 36 that overhangs the finger lateral surface 34. The top surface 38 of the tab 37 slopes upwardly from above the undercut surface 36 to above the leg 35.

The inner slide 7 further comprises the downwardly depending web 11 mentioned previously. The web sides taper gradually toward the web margin 39, but the web edge 41 may be relatively blunt. The outside end of the web defines the longitudinally extending opening 15 that is partially closed by a hook 43. The web extends to the inside end 21 of the plate 19, thereby imparting maximum rigidity to the inner slide 7 against bending or bowing in a direction perpendicular to the plane of the plate.

The inner slide outer end 22 terminates in a hollow widened pocket 47. The pocket 47 is formed with a floor 49, opposed side walls 51, a front wall 53, and an end wall 55. The side walls 51 define ledges 57 extending therealong. The front and back walls 53 and 55 define short respective ledges 59 and 61 that are coplanar with the ledges 57. The pocket is covered with a removeable flat plug 63. To retain the plug on the inner slide 7, the plug is formed with several depending hooked tabs 65 that engage openings or recesses 67 in the pocket front and back walls. To provide access to the hooked tabs 65 for removing the plug, at least one of the openings 67 extends completely through the associated wall. Labels, not shown, may be attached to the plug for identifying the papers 3 that are hung by the document handle 1. If desired, the plugs may be manufactured in different colors to color code the document handles and their papers.

The spacing between the outer surface of the pocket side walls 51 is equal to the width of the adjustable end 9, as will be explained presently. To permit easy grasping of the inner slide 7, the outer surface of the pocket side walls are formed with serrations 68. To the pocket end wall is joined a downwardly facing hook 45.

Turning now to FIGS. 1, 2, and 6-10, the adjustable end 9 comprises an elongated U-shaped channel 69 composed of a top leg 71 and a pair of spaced side legs 73. The spacing between the side legs 73 is such that the plate 19 of the inner slide 7 fits within the U-shaped channel 69, with a small clearance between their respective lateral edges. The height of the channel side legs is preferably equal to the thickness H1 of the outside end 21 of the inner slide plate 19. (Also see FIG. 5.) To provide maximum rigidity to the adjustable end, the channel top leg is formed with a longitudinally extending rib 72.

To retain the inner slide 7 within the adjustable end channel 69, the adjustable end side legs 73 have extensions 75 that protrude beyond the end 76 of the top leg 71. To the lower edges of the side leg extensions 75 are joined allochiral lips 77 having top surfaces that are parallel to the plane of the channel top leg. The lips 77, extensions 75, and channel top leg define a columnar opening 78. The spacing between the end 76 of the channel top leg and the lips 77 is slightly greater than the thickness H1 of the inner slide plate 19.

The outside end 79 of the adjustable end 9 is formed with the web 13, which preferably is connected to and depends from the channel top leg 71. The outer end of the web 13 defines the hooked opening 17, which is substantially identical to the opening 15 described previously with respect to the inner slide 7.

The adjustable end outside end 79 further defines a pocket 81 that is similar to the pocket 47 described in connection with the inner slide 7. The side walls of the pocket 81 coincide with the channel side legs 73. The pocket 81 has a floor 83 and opposed front and end walls 85, 86, respectively. The side walls and front and end walls 85, 86 have respective ledges 82 and 87 for supporting a plug 63 in a manner similar to that described previously in connection with the inner slide. The outer surfaces of the pocket side walls are formed with serrations 89 similar to the serrations 68. A hook 91, identical to the hook 45, is connected to the pocket end wall 86.

Spaced along the channel top leg 71 are a series of pairs of openings 93, 95, and 97. The openings 93, 95, and 97 are sized to receive the latches 33.

Figure 12:
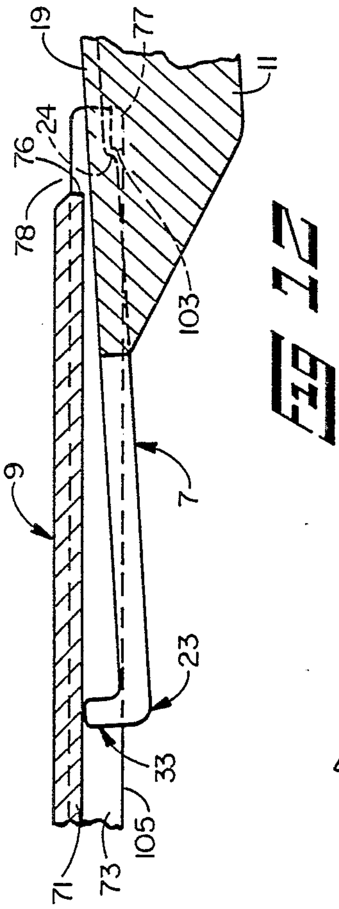
FIG. 12 is a partial cross sectional view similar to FIG. 11, but showing the document handle assembled for engagement with document binder posts.
Figure 11:
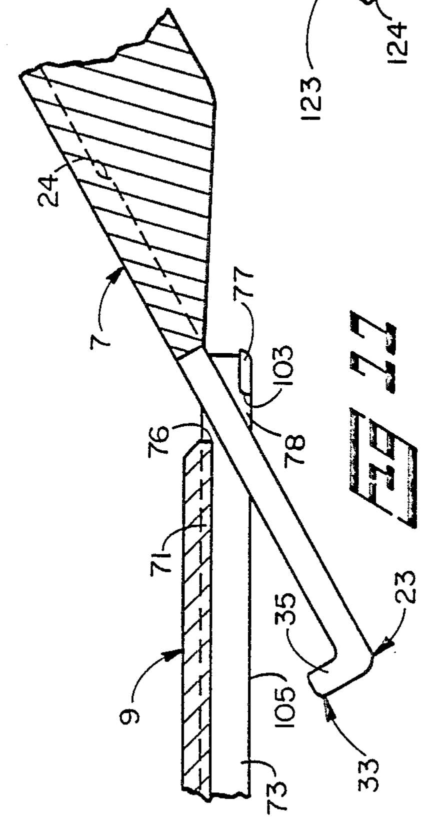
FIG. 11 is a partial cross sectional view of a partially assembled document holder according to the present invention.

Looking also at FIGS. 11 and 12, the document handle 1 of the present invention is assembled by inserting the flexible fork 23 of the inner slide 7 through the columnar opening 78 of the adjustable end 9. Because the tabs 37 of the inner slide latches 33 overhang the lateral surfaces 34 of the fingers 25, the two fingers must be manually squeezed together slightly in the direction of arrows 99 in FIG. 3 before the fork can enter the opening 78. The spacing between the end 76 of the channel top leg 71 and the inner edge 103 of the lips 77 is such that when the inner slide initially enters the adjustable end opening 78, the inner slide latches 33 are prevented from contacting the top leg 71. As the inner slide is inserted farther into the opening 78, the web 11 passes between the two lips 77, and the steps 24 reach the inner edges 103 of the lips. At that point, the lesser thickness H2 of the inner slide plate 19 permits the inner slide to rotate such that the latches 33 can swing to contact the channel top leg 71, FIG. 12. In doing so, the latch tab tapered surfaces 38 over the undercut surfaces 36 contact the lower edges 105 of the channel side legs 73. Consequently, the fingers 25 are deflected toward each other in the direction of the arrows 99 of FIG. 3 as they enter the channel 69. With the inner slide 7 and adjustable end 9 in the position of FIG. 12, the inner slide, including the latches 33, can be slid within the adjustable end channel 69 toward the adjustable end outside end 79, that is, toward the left in FIGS. 1, 2, and 12. On the other hand, the inner slide cannot be unintentionally slid out of the adjustable end if the tabs 37 are in contact with the adjustable end top leg. That is because the step 24 will strike the lips 77 and prevent further sliding contact. To remove the inner slide from the adjustable end, the two parts must be intentionally rotated to the position of FIG. 11.

At three distinct relative positions of the inner slide 7 and adjustable end 9, the latches 33 become aligned with openings 93, 95, or 97. When such alignment occurs, slight hand pressure on the inner slide and adjustable end outer ends forces the latch tabs 37 through the channel openings. The legs 35 are dimensioned such that the tab overhanging surfaces 36 rise above the top surface of the channel top leg 71. As a result, the flexible fingers 25 resiliently return to the undeflected position wherein the fingers' lateral surfaces 34 have only minimum clearance with the inside surfaces of the channel side legs, and the undercut surfaces 36 overlie the top surface of the channel top leg 71. Consequently, the inner slide is locked to the adjustable end. The adjustable end openings 93, 95, and 97 enable the inner slide and adjustable end to be locked together such that the web hooked openings 15 and 17 engage the binder posts 5 for three different sizes of standard papers 3. Additional holes similar to holes 93, 95, and 97 can be added to the adjustable end as new media sizes are developed.

In use, the inner slide 7 and adjustable end 9 are assembled to the configuration of FIG. 12. The adjustable end and inner slide are relatively positioned such that the spacing between the web hooked openings 15 and 17 is slightly less than the spacing between the binder posts 5 of a sheaf of bound documents 3. The webs 11 and 13 are inserted into the bound papers. Next the inner slide and adjustable end are slid apart until the hooked openings engage the binder posts. Simultaneously, the latches 33 enter the corresponding adjustable end openings 93, 95, or 97 to lock the inner slide to the adjustable end. The document handle 1 is then ready for carrying and storing the papers in an efficient manner.

Figure 10:
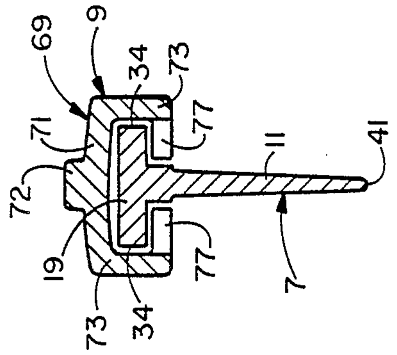
FIG. 10 is an enlarged cross sectional view taken along lines 10—10 of FIG. 1.
Figure 7:
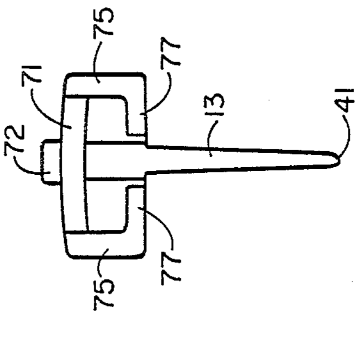
FIG. 7 is an enlarged view taken along lines 7—7 of FIG. 6 and rotated 90 degrees counterclockwise.
Figure 9:
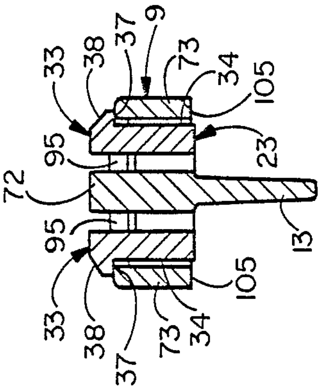
FIG. 9 is an enlarged cross sectional view taken along lines 9—9 of FIG. 1.

Storage may be accomplished by suspending the document handle 1 between a pair of spaced bars by the hooks 45 and 91. Referring especially to FIGS. 9 and 10, it will be noticed that the document handle has a generally T-shaped cross section. Thus, the document handle can also be stored by sliding it into a rack or cabinet having an inverted C-shaped channel sized to receive and support the T-shaped document handle. The equal widths of the adjustable end channel 69 and the side walls 51 of the inner slide pocket 47 facilitate easy sliding within the storage cabinet or rack.

Figure 13:
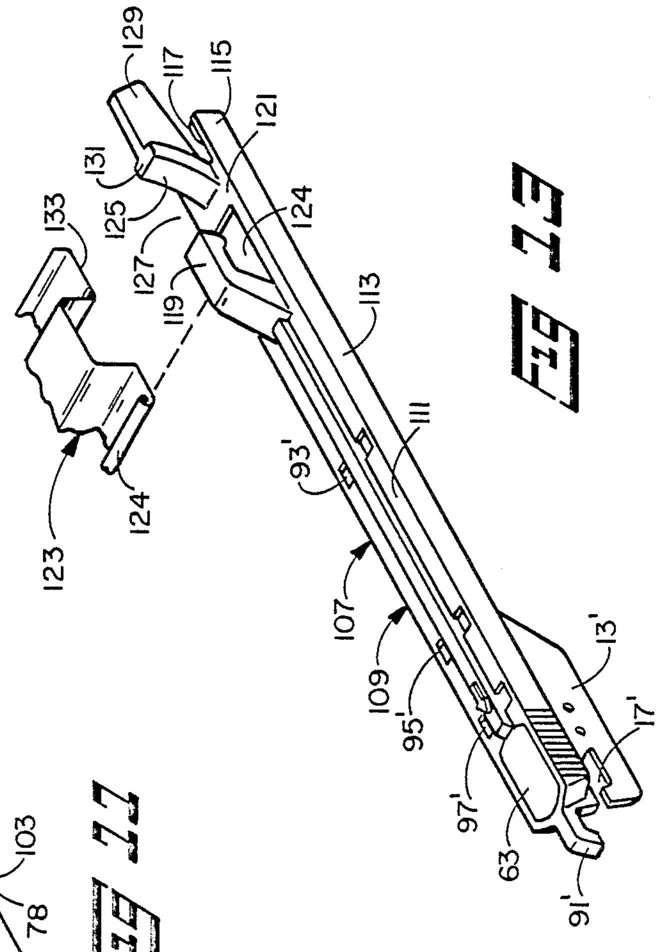
FIG. 13 is a partially broken perspective view of a modified embodiment of the invention.

Further in accordance with the present invention, the document handle of the present invention may be constructed to permit hanging from a rack. Turning to FIG. 13, a modified adjustable end 107 is illustrated. The adjustable end 107 is generally similar to the adjustable end 9 described previously. That is, the adjustable end 107 has a web 13′ with a hooked opening 17′, a pocket covered by a plug 63, a hook 91′, and a ribbed U-shaped channel 109 composed of a top leg 111 and side legs 113. The channel top leg 111 defines openings 93′, 95′, and 97′. The adjustable end 107 further comprises extensions 115 and lips 77 substantially identical to the extensions 75 and lips 77 of the adjustable end 9 described previously. The modified adjustable end 107 is used with the inner slide 7 (not shown in FIG. 13) previously described in connection with the document handle 1.

To hang the adjustable end 107 with the inner slide 7 and bound papers (not illustrated), the adjustable end 107 is formed with a center hook 19. The center hook 119 is fastened to the channel top leg 111 toward the inner end 121 thereof. The center hook 119 is adapted to support the adjustable end 107 from the sheet metal rack 123 that has a rolled end 124 lying perpendicular to the adjustable end longitudinal axis. If desired, a cutout 124 may be formed in the channel top leg 111. To help guide the adjustable end onto the rack 123, a sloped guide plate 125 is attached to the channel top leg 111 in a manner that forms a passage 127 for the rack end 124. A wing 129 fastened to the outside of the plate 121 assists the user to push the document holder along the rack 123. In addition, the top surface 131 serves as a stop for bearing against the undersurface 133 of the rack. Consequently, the document handle remains in a horizontal attitude when hung on the rack end 124 regardless of any imbalance caused by the different positions of the inner slide with respect to the adjustable end. The manner of assembly and use of the adjustable end 107 with the inner slide 7 is identical to the assembly and use of the adjustable end 9 with the inner slide, as described previously.

Thus, it is apparent that there has been provided, in accordance with the invention, an adjustable document handle that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An adjustable document handle comprising:

a. an elongated generally U-shaped channel terminating in opposed inside and outside ends, the channel having a top leg that defines at least one set of first openings therein;

b. a web depending from the channel top leg at the outside end thereof, the web having an outside end that defines a second opening in predetermined spaced relation to the top leg first openings; and c. slide means for sliding within the U-shaped channel and having forked means for locking thereto by means of the first openings therein, the slide means defining a third opening spaced predetermined distance from the U-shaped channel web second opening when the U-shaped channel and slide means are locked together, so that the U-shaped channel and slide means are lockable together to provide a predetermined spacing between the second and third openings.

2. The adjustable document handle of claim 1 wherein the slide means comprises:

a. an elongated plate having inside and outside ends and having a width sized to slide within the U-shaped channel, the fork means being attached to the plate inside end for sliding within the U-shaped channel and for cooperating with the first openings therein to lock the slide means and U-shaped channel to each other at a predetermined relative location; and b. a web depending from the plate outside end and having an outside end that defines the third opening, the third opening being in predetermined spaced relationship to the fork means.

3. An adjustable document handle comprising:

a. an adjustable end comprising:

i. an elongated generally U-shaped channel having inside and outside ends, the channel having a top leg that defines at least one set of openings therein; and ii. a web depending from the channel at the outside end thereof, the web having an outside end that defines an opening in predetermined spaced relation to the top leg openings; and b. an inner slide comprising:

i. an elongated plate having inside and outside ends and having a width sized to slide within the U-shaped channel of the adjustable end;

ii. fork means attached to the plate inside end for sliding within the adjustable end channel and for cooperating with the openings therein to lock the inner slide and adjustable end to each other at a predetermined relative location; and iii. a web depending from the plate outside end and having an outside end that defines an opening in predetermined spaced relationship to the fork means, so that the inner slide and adjustable end are lockable together to provide a predetermined longitudinal spacing between the respective web openings.

4. The document handle of claim 3, wherein:

a. the adjustable end channel comprises a pair of parallel side legs joined to the top leg;

b. the channel side legs are formed with extensions that extend beyond the inside end of the channel top leg; and c. the adjustable end further comprises lip means joined to the channel side leg extensions for guiding the inner slide within the adjustable end channel.

5. The document handle of claim 4 wherein the inner slide plate is fabricated with a first thickness at the inside end thereof and a second thickness less than the first thickness at the outside end thereof, so that the plate defines a step between the inside and outside ends for abutting the adjustable end lip means when the inner slide is slid within the adjustable end toward the outside end thereof.

6. The document handle of claim 5 wherein the adjustable end lip means and the inner slide plate step cooperate to limit sliding motion of the inner slide within the adjustable end.

7. The document handle of claim 4 wherein the inner slide further comprises:

a. an open pocket being partially defined by a pair of opposed side walls spaced apart a distance greater than the width of the plate and approximately equal to the spacing between the side legs of the adjustable end; and b. plug means for removaby covering the pocket.

8. The document handle of claim 4 wherein:

a. the inner slide plate is partially defined by laterally opposed longitudinally extending surfaces; and b. the fork means comprises:

i. a pair of flexible fingers cantilever joined to the inner slide plate inside end, the fingers having respective lateral surfaces that are generally coplanar with the respective lateral surfaces of the inner slide plate; and ii. latch means joined to the free ends of the fingers for entering the openings is the adjustable end channel top leg.

9. The document handle of claim 8 wherein the latch means comprises:

a. an upstanding leg attached to the free end of each finger; and b. a tab mounted to each upstanding leg, the tabs defining respective surfaces that overhang the lateral surfaces of the respective fingers, the overhanging surfaces of the tabs being spaced apart a distance greater than the spacing between the adjustable end channel side legs when the flexible fingers are in an undeflected condition, the tabs defining respective tapered surfaces that extend from above the overhanging surfaces to above the upstanding legs, so that the fingers are deflected toward each other when they are within the adjustable end channel and resiliently return to the undeflected condition when the tabs enter the adjustable end openings with the overhanging surfaces in overlying engagement with the adjustable end channel top leg to thereby lock the inner slide to the adjustable end.

10. The document handle of claim 4 wherein the lip means comprises a pair of allochiral lips attached to the respective adjustable end side leg extension and separated by a space sufficient for passage of the inner slide web therebetween, the lips having respective inner edges and the channel top leg terminating in an inside end, the lips inner edges and the channel to leg inside end cooperating to define a columnar opening therebetween for receiving the inner slide fork means.

11. The document handle of claim 3 wherein the adjustable end further comprises a rib extending along and joined to the channel top leg to thereby enhance the rigidity of the adjustable end.

12. The document handle of claim 3 wherein the inner slide fork means comprises:

a. a pair of parallel flexible fingers cantilever joined to the plate inside end; and b. latch means joined to the free ends of the fingers for entering the openings in the adjustable end channel top leg.

13. The document handle of claim 12 wherein the latch means comprises:

a. a leg upstanding attached to the free end of each finger; and b. a tab joined to each upstanding leg, each tab being formed with an undercut surface that overhangs the upstanding leg and a tapered surface that slopes from above the overhanging surface to above the upstanding leg.

14. The document handle of claim 3 wherein the adjustable end further comprises:

a. a center hook joined to and extending above the channel top leg for suspending the document holder on a rod lying transverse to the inner slide and adjustable end; and b. plate means joined to the channel top leg for cooperating with the center hook to facilitate hanging the document holder from the transverse rod.

15. The document holder of claim 3 wherein the adjustable end top leg defines a plurality of sets of openings for cooperating with the inner slide fork means to lock the inner slide and adjustable end together, so that the inner slide and adjustable end are lockable together to provide a plurality of predetermined distances between the openings in the respective webs.

16. Apparatus for binding multi-page documents comprising:

a. an elongated channel having a top leg and a two opposed parallel side legs and having first and second ends, the channel top leg defining at least one opening therethrough;

b. a web joined to and depending from the channel top leg at the first end thereof, the web defining a hooked opening; and c. allochiral lips attached to the channel side legs at the respective second ends thereof.

17. The apparatus of claim 16 wherein:

a. the channel side legs at the second ends thereof extend beyond the top leg; and b. the lips are joined to the ends of the respective side leg extensions and have respective inner edges; and c. the channel top leg terminates at the second end thereof in an inside end that cooperates with the lips inner edges to define a columnar opening between the top leg and the lips.

18. The apparatus of claim 16 further comprising a rib extending longitudinally along the channel top leg to thereby impart stiffness against bending to the channel.

19. Apparatus for binding multipage documents comprising:

a. an elongated plate having first and second ends and opposed lateral sides;

b. a web joined to and extending perpendicular to the plate, the web defining a hooked opening located beneath the plate second end;

c. a pair of flexible fingers having lateral sides and being cantilever joined to and extending longitudinally from the plate first end; and d. latches joined to the free ends of the respective fingers.

20. The apparatus of claim 14 further comprising an open pocket formed in the plate second end, the pocket being partially defined by a floor and a pair of side walls joined to the floor and having a lateral spacing greater than the lateral spacing of the plate lateral sides.

21. The apparatus of claim 19 wherein the top plate is formed with a first thickness at the first end thereof and a second thickness less than the first thickness at the second end thereof.

22. The apparatus of claim 19 wherein the latches comprise:

a. a short leg upstanding from each finger free end; and b. a tab joined to each upstanding leg, the tab having a first surface that overhangs the respective finger lateral side and a second surface that slopingly extends from above the first surface to above the upstanding leg.

23. In combination with a sheaf of documents bound with a pair of spaced binder posts, an adjustable document handle for holding and storing the documents comprising:

a. an adjustable end comprising:

i. an elongated generally U-shaped channel having inside and outside ends, the channel being formed with a top leg and a pair of spaced side legs, the top leg defining at least one opening therethrough; and ii. a web joined to and depending from the channel top leg, the web having an opening adapted to engage a first binder post; and b. an inner slide comprising:

i. an elongated plate having inside and outside ends and slidable within the adjustable end channel;

ii. a web joined to and depending from the plate, the web defining an opening engagable with the other binder post; and iii. fork means joined to the plate inside end for sliding within the adjustable end channel and for cooperating with the adjustable end plate openings to lock the inner slide to the adjustable end at a predetermined location such that the web openings of the inner slide and adjustable end engage the document binder posts.

24. The combination of claim 23 wherein:

a. the adjustable end channel side legs are formed with extensions that extend beyond the inside end of the channel top leg; and b. the adjustable end further comprises allochiral lips joined to the channel side leg extensions, the lips slidingly supporting the inner slide within the adjustable end channel, the lips having respective inner edges and the channel top leg terminating in an inside end, the lips inner edges cooperating with the inside end of the channel top leg to form a columnar opening through the adjustable end for receiving the inner slide.

25. The combination of claim 23 wherein the adjustable end further comprises a rib extending along and joined to the channel top leg to thereby enhance the rigidity of the adjustable end.

26. The combination of claim 23 wherein the inner slide further comprises:

a. an open pocket formed in the plate at the outside end thereof, the pocket being partially defined by a pair of opposed side walls spaced apart a distance greater than the width of the plate and approximately equal to the spacing between the side legs of the adjustable end; and b. plug means for removably covering the pocket.

27. The combination of claim 23 wherein the inner slide fork means comprises:

a. at least one flexible finger cantilever joined to the plate inside end; and b. latch means joined to the free end of the finger for engaging the opening in the adjustable end channel top leg.

28. The combination of claim 21 wherein the latch means comprises:

a. a leg upstandingly attached to the free end of the finger; and b. a tab joined to the upstanding leg, the tab being formed with an undercut surface that overhangs the upstanding leg and a tapered surface that slopes from above the overhanging surface to above the upstanding leg.

29. The combination of claim 23 wherein:

a. the inner slide plate is fabricated with a first thickness at the inside end thereof and a second thickness less than the first thickness at the outside end thereof to thereby define a step between the inside and outside ends; and b. the adjustable end lip means and the inner slide plate step cooperate to limit sliding motion of the inner slide within the adjustable end.

30. The combination of claim 23 wherein the adjustable end further comprises:

a. a center hook joined to and extending above the channel top leg; and b. plate means joined to the channel top leg for cooperating with the center hook to facilitate suspending the document handle on a rack lying transverse to the inner slide and adjustable end.

31. The combination of claim 23 wherein the adjustable end top leg defines a plurality of sets of openings for cooperating with the inner slide fork means to lock the inner slide and adjustable end together, so that the inner slide and adjustable end are lockable together to provide a plurality of predetermined distances between the openings in the respective webs for engaging binder posts with different spacings therebetween.

32. A method of handling and storing a sheaf of documents bound with a pair of spaced binder posts comprising the steps of:

a. providing a first member having an elongated plate, a web extending perpendicular to the plate and defining an hooked opening, and a pair of latches joined to the plate;

b. providing a second member having an elongated channel adapted to slidingly receive the first member plate and latches, a web extending perpendicular to the channel and defining a hooked opening, the channel defining openings therein adapted to receive the first member latches and lock the first and second members to each other such that the hooked openings of the webs of the first and second members are at predetermined spaced distances;

c. placing the second member plate within the first member channel;

d. sliding the first member within the second member until the hooked openings of the webs of the first and second members are located between the document binder posts;

e. inserting the webs of the first and second members between selected sheets of the documents; and f. sliding the first and second members apart to engage the binder posts with the respective web openings and simultaneously engaging the first member latches with the second member channel openings to thereby lock the two members to each other, so that the bound documents may be carried and stored by means of the document handle.

33. The method of claim 32 wherein:

a. the stop of providing a second member comprises the step of providing a member defining a columnar opening therethrough that communicates with the second member channel; and b. the step of placing the first member top plate within the second member channel comprises the step of inserting the first member latches and plate through the second member columnar opening prior to placing the first member plate into the second member channel.

34. The method of claim 33 wherein the step of placing the first member plate within the second member channel further comprises the step of resiliently deflecting the latches to fit within the second member channel.

35. The method of claim 34 wherein the step of engaging the first member latches with the second member channel openings comprises the steps of:

a. aligning the first member latches with the second member channel openings;

b. pivoting the first and second members relative to each other to cause the first member latches to enter the second member channel openings; and c. resiliently releasing the deflected latches and engaging the second member channel with the relaxed latches to thereby lock the first and second members to each other.

* * * * *